United States Patent
Stabrey

(10) Patent No.: US 8,958,953 B2
(45) Date of Patent: Feb. 17, 2015

(54) TRAVEL DIRECTION STABILIZATION SYSTEM FOR VEHICLES

(75) Inventor: Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1026 days.

(21) Appl. No.: 12/846,174

(22) Filed: Jul. 29, 2010

(65) Prior Publication Data

US 2011/0054741 A1 Mar. 3, 2011
US 2013/0166151 A9 Jun. 27, 2013

Related U.S. Application Data

(63) Continuation-in-part of application No. 11/887,437, filed as application No. PCT/EP2006/050949 on Feb. 15, 2006, now Pat. No. 8,386,124.

(30) Foreign Application Priority Data

Aug. 26, 2009 (DE) .......................... 10 2009 028 880

(51) Int. Cl.

| | | |
|---|---|---|
| G08G 1/16 | (2006.01) | |
| B62D 6/00 | (2006.01) | |
| B60T 8/1755 | (2006.01) | |
| B60W 10/16 | (2012.01) | |
| B60W 10/18 | (2012.01) | |
| B60W 10/20 | (2006.01) | |
| B60W 30/08 | (2012.01) | |
| B62D 15/02 | (2006.01) | |

(52) U.S. Cl.
CPC ............... *B62D 6/003* (2013.01); *B60T 8/1755* (2013.01); *B60W 10/16* (2013.01); *B60W 10/18* (2013.01); *B60W 10/20* (2013.01); *B60W 30/08* (2013.01); *B62D 15/0265* (2013.01); *B60T 2201/083* (2013.01); *B60T 2201/087* (2013.01); *B60T 2201/16* (2013.01); *B60W 2030/082* (2013.01); *B60W 2520/14* (2013.01)
USPC .................. 701/43; 701/1; 701/301; 340/435

(58) Field of Classification Search
None
See application file for complete search history.

(56) References Cited

U.S. PATENT DOCUMENTS

| | | | | |
|---|---|---|---|---|
| 6,267,194 B1 * | 7/2001 | Bullinger et al. | ............. | 180/275 |
| 6,657,539 B2 * | 12/2003 | Yamamoto et al. | ........... | 340/438 |
| 6,732,021 B2 * | 5/2004 | Matsumoto et al. | ............. | 701/1 |
| 7,283,907 B2 | 10/2007 | Fugiwara et al. | | |
| 7,893,819 B2 * | 2/2011 | Pfeiffer et al. | ................. | 340/435 |
| 8,255,122 B2 * | 8/2012 | Tanaka | ............................. | 701/48 |
| 2001/0030688 A1 * | 10/2001 | Asahi et al. | ................... | 348/118 |

(Continued)

FOREIGN PATENT DOCUMENTS

| | | | |
|---|---|---|---|
| DE | 100 29 874 | | 1/2001 |
| JP | 2003154910 A | * | 5/2003 |
| WO | WO2005/019687 | * | 3/2005 |

*Primary Examiner* — James Trammell
*Assistant Examiner* — Demetra Smith-Stewart
(74) *Attorney, Agent, or Firm* — Kenyon & Kenyon LLP

(57) ABSTRACT

A method for influencing the direction of travel of a vehicle. In order to lower the risk of accidents in driving situations in which the driver reacts incorrectly, for example because of being surprised, it is provided that the driving operation be monitored in reference to the occurrence of an event due to which the travel direction of the vehicle changes, deviating from the travel direction specified at the steering wheel, and when such an event is detected that an automatic intervention in the driving operation be performed whereby the vehicle is moved back approximately into the original direction of travel in which it was moving before the event occurred.

13 Claims, 4 Drawing Sheets

(56) References Cited

U.S. PATENT DOCUMENTS

| | | | |
|---|---|---|---|
| 2003/0156015 A1* | 8/2003 | Winner et al. | 340/425.5 |
| 2004/0230375 A1* | 11/2004 | Matsumoto et al. | 701/301 |
| 2005/0267683 A1* | 12/2005 | Fujiwara et al. | 701/301 |
| 2006/0052917 A1* | 3/2006 | Schwarzhaupt et al. | 701/29 |
| 2008/0086251 A1* | 4/2008 | Lu et al. | 701/70 |
| 2009/0005933 A1* | 1/2009 | Tabata et al. | 701/42 |
| 2010/0004815 A1* | 1/2010 | Ewerhart et al. | 701/35 |
| 2010/0152949 A1* | 6/2010 | Nunan et al. | 701/29 |

* cited by examiner

TRAVEL DIRECTION STABILIZATION SYSTEM FOR VEHICLES

CROSS-REFERENCE TO RELATED APPLICATION

The present application is a continuation-in-part of U.S. patent application Ser. No. 11/887,437, filed on Sep. 21, 2009 now U.S. Pat. No. 8,386,124, which is the National Stage of International Patent Application Ser. No. PCT/EP2006/050949, filed Feb. 15, 2006.

FIELD OF THE INVENTION

The present invention relates to a method for influencing the direction of travel of a vehicle, and to a corresponding device.

BACKGROUND INFORMATION

Most motor vehicles today have vehicle dynamics controllers such as ESP installed, which support the driver in critical driving situations and stabilize the vehicle automatically. Known vehicle dynamics controllers usually perform a yaw rate control, wherein a target value for the yaw rate of the vehicle is calculated taking into consideration the steering wheel position, the vehicle speed, and other variables. In driving situations in which the measured actual yaw rate deviates too severely from the target yaw rate, for example because of the vehicle oversteering or understeering, an automatic braking or steering intervention is performed which stabilizes the vehicle again. As a result, the vehicle is guided to a trajectory whose radius is defined substantially by the driver through the steering wheel position.

Driving situations may arise in which the steering wheel position chosen by the driver is unfavorable. This is the case, for example, when the vehicle undergoes a yaw moment, due to an event such as a collision, as a result of which the travel direction of the vehicle changes. If the driver does not take countermeasures in such a situation, for example because of surprise or due to shock, the vehicle dynamics controller intervenes and stabilizes the vehicle. But the travel direction in which the vehicle is stabilized does not correspond to the original travel direction of the vehicle before the event occurred. If a vehicle is traveling, for example, on a straight roadway in a certain direction and is set in rotation about the vertical axis by an oblique rear-end collision, the vehicle dynamics controller intervenes and slows the yaw movement of the vehicle. As soon as the vehicle has stabilized, it moves on in accordance with the steering wheel position chosen by the driver. If the driver did not change the steering wheel position after the rear-end collision, the vehicle continues to move along a course that is rotated by a certain angle relative to the original direction of motion. After a time the vehicle leaves the roadway, which increases the danger of a secondary accident.

SUMMARY OF THE INVENTION

An object of the present invention is therefore to recognize driving situations of this type and to initiate measures using which driving safety may be improved.

This object is achieved by a method and a device according to the present invention.

An important aspect of the present invention includes monitoring the travel status of the vehicle in reference to the occurrence of an event such as a collision, as a result of which the travel direction of the vehicle changes unintentionally, deviating from the travel direction specified at the steering wheel. When such an event is detected, an automatic intervention is performed by which the vehicle is rotated back by a relative yaw angle by which it rotated previously relative to the roadway as a consequence of the event. The steering wheel angle set by the driver after the occurrence of the event is preferably not taken into account when determining the relative yaw angle. This method makes it possible to orient a vehicle in such a way that the direction of motion of the vehicle after the collision corresponds essentially to the direction of the roadway.

A vehicle that was moving in a straight line in a certain direction before the event occurred and was deflected by a collision is guided back to a straight line in the same direction by the assistance system according to the present invention. The relative yaw angle in this case is that angle by which the vehicle has rotated around the vertical axis as a result of the event.

If the vehicle is moving on a curved trajectory having a certain radius of curvature before the event occurs, after a collision it is oriented in such a way that the angle between the direction of the roadway and the longitudinal direction of the vehicle is approximately the same as before the collision. That is, the vehicle is rotated back by a relative yaw angle by which the travel direction of the vehicle changed relative to the direction of the roadway.

As soon as the new direction of travel has been reached, the assistance function is preferably deactivated and the conventional vehicle dynamics control activated, so that the vehicle again follows the driver's steering instructions.

Since the driver is ignored, so to speak, by the assistance program according to the present invention, it is of the utmost importance to identify such an event reliably. According to a preferred specific embodiment of the present invention, it is therefore provided that such an event is recognized when the original travel direction of the vehicle changes but the steering wheel angle specified by the driver does not correspond sufficiently to the vehicle behavior. A plausibility test is thus performed, in which the relationship between the yaw behavior of the vehicle and the steering response of the driver is determined. Furthermore, additional physical variables that accompany such an event are preferably monitored. For example, a collision may be detected with the aid of acceleration sensors. In addition, it is possible to check whether an airbag has been deployed, a tire defect has occurred, and/or some other signal is present that points to such an event.

The automatic intervention is preferably carried out with the aid of the brake system and/or the steering system and/or an active differential of the vehicle. The control action according to the present invention may be carried out in conjunction with a control or regulation.

In order to determine the relative yaw angle by which the vehicle must be steered back, the change of the vehicle yaw angle over time since the occurrence of the event is integrated. In addition, the vehicle speed is preferably also time-integrated, and from the result the change in direction of the roadway is determined, taking into account the curvature of the roadway.

Assuming that the curvature K of the roadway is approximately constant for moderate distances, the resulting angular change $\Delta\Psi_{FB}$ of the roadway is:

$$\Delta\Psi_{FB} = \kappa \int v \, dt$$

The angular change of the vehicle due to the event is found by integrating the measured yaw rate $\Psi$:

$$\Delta\Psi_{FZ} = \int \psi \, dt$$

The yawing moment $M_z$, which may be set, for example, using the wheel brakes, is found then in the simplest case when a proportional controller is used:

$$M_Z = K(\Delta\Psi_{FB} - \Delta\Psi_{FZ})$$

The angular difference $(\Delta\Psi_{FB} - \Delta\Psi_{FZ})$ here is the relative yaw angle by which the vehicle has rotated relative to the roadway. In addition to proportional controllers, other controller structures are naturally also possible. For example, an additional D component may be provided in the controller in order to prevent overshooting the yaw angle. The yawing moment $M_z$ determined from the algorithm is preferably set by subordinate controllers, which regulate, for example, the braking moment acting on the brakes. As mentioned earlier, however, other control elements such as a steering actuator or an active differential may also be triggered in order to turn the vehicle.

The assistance function according to the present invention, including signal analysis and control, is preferably realized as software that runs on a controller.

DETAILED DESCRIPTION

Figure 1:
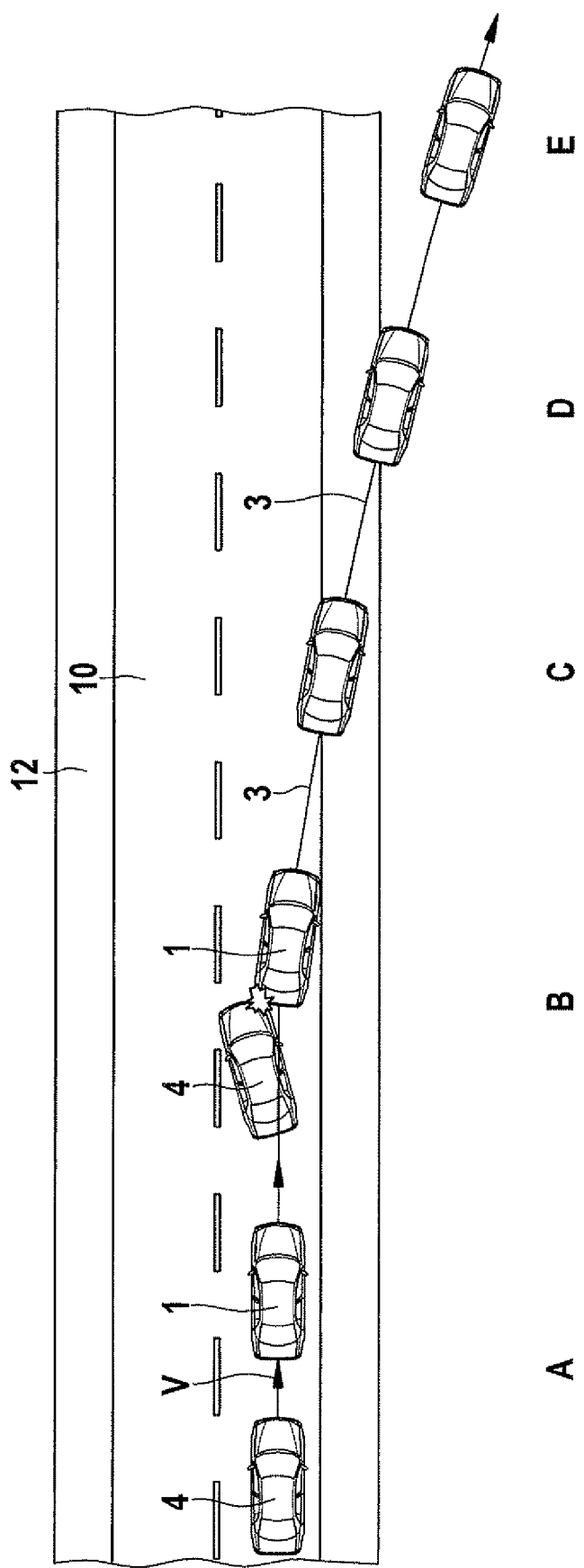
FIG. 1 shows the motion of a vehicle having conventional vehicle dynamics control after the occurrence of an external event.

FIG. 1 depicts a roadway 10 having shoulders 12, on which a vehicle 1 is moving from left to right. The drawing illustrates the movement behavior of a vehicle that is equipped with a conventional vehicle dynamics control, after a collision. In state A vehicle 1 is moving at a velocity v on an essentially straight trajectory 3. Shortly afterward, in state B, vehicle 1 is deflected by an oblique rear-end collision with another vehicle 4 and is caused to rotate. As soon as the vehicle dynamics control detects too great a deviation of the actual from the target yaw rate, a yawing moment around the vertical axis of the vehicle is exerted through the wheel brakes, which counteracts the yawing motion of the vehicle and stabilizes the vehicle. If the driver holds the steering wheel tightly in the original position, for example because he is in shock or reacts incorrectly, vehicle 1 is guided by the vehicle dynamics control onto a straight trajectory. Vehicle 1 continues to travel straight ahead in the new direction in this case and leaves the roadway, as shown in states C through E.

Figure 2:
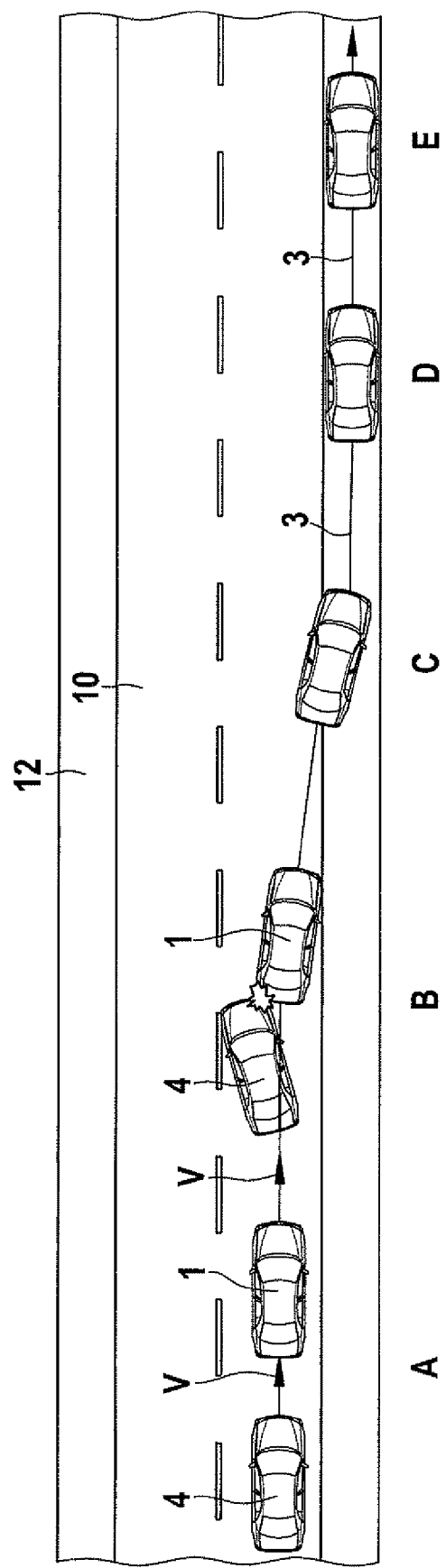
FIG. 2 shows the motion of a vehicle having travel direction control according to the present invention after the occurrence of an external event.

FIG. 2 shows by comparison the movement behavior of a vehicle in the same accident situation, where vehicle 1 is equipped with a vehicle dynamics control according to the present invention having an additional travel direction stabilization function. In this case again an oblique rear-end collision occurs in state B, by which vehicle 1 is deflected. As before, the vehicle dynamics control detects a yaw rate deviation and sets a braking moment at the wheel brakes, for example using subordinate brake controllers, which counteracts the yawing motion of vehicle 1. But in contrast to conventional controllers, the yawing moment $M_z$ exerted by the controller is such that the vehicle is rotated back by a relative yaw angle by which it rotated previously relative to the roadway as a result of the event. The steering angle specified at the steering wheel by the driver is essentially ignored here, since the deviation in yaw rate may be attributed to the collision due to additional information from the airbag controller.

As may be seen from the figure, in states C through E vehicle 1 is guided onto a trajectory that runs parallel to the original trajectory and thus in the same direction.

Figure 3:
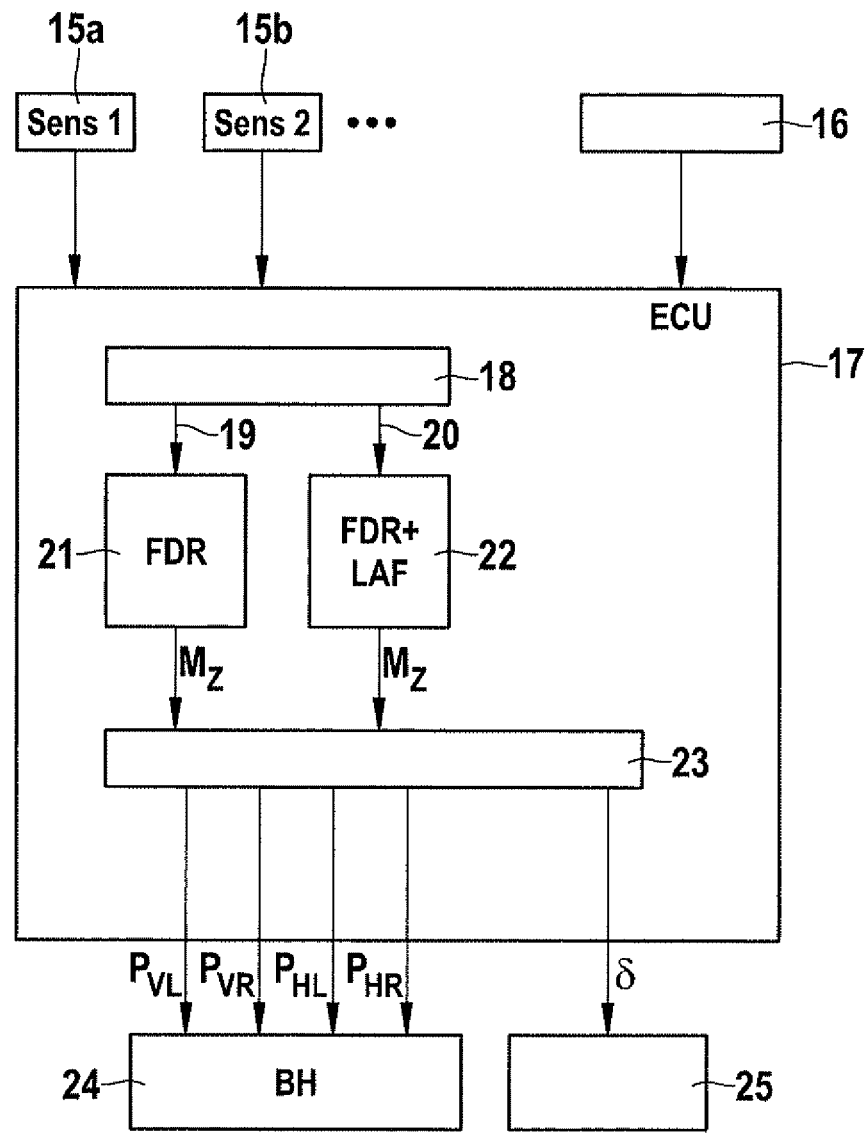
FIG. 3 shows a schematic functional structure of a vehicle dynamics control system having an integrated travel direction controller.

FIG. 3 shows a simplified block diagram of a vehicle dynamics control system according to the present invention. This includes one or more sensors 15a, 15b for monitoring the travel status in reference to an event like that described above. Sensors 15a, 15b may include, for example, lateral acceleration sensors, wheel speed sensors, a yaw rate sensor, a camera, or any other sensors that are suitable for detecting such an event. In addition, the signals from other vehicle systems such as an airbag system 16, which give an indication of such an event, are also analyzed. The total system also includes such sensors (not shown) as are necessary to carry out conventional vehicle dynamics control.

An algorithm 18 for situation detection analyzes the sensor signals and preferably performs a plausibility test in which the relationship between the yaw behavior of vehicle 1 and the steering response of the driver is determined. If the yaw rate deviation is too great without the presence of additional factors that indicate a collision, then a driving situation merely exists in which the vehicle is oversteering or understeering, for example because the driver entered the curve at too high a speed. In this case a signal 19 is generated, and vehicle dynamics controller 21 intervenes in the driving operation in the conventional way to stabilize vehicle 1. In this case the yawing moment $M_z$ calculated by vehicle dynamics controller 21 is implemented via subordinate braking moment controllers 23 and wheel brakes 24.

If there is an additional signal present which signals the release of an airbag, for example, situation detection element 18 detects an invention-relevant event. In this case a modified vehicle dynamics control is performed, in which a yawing moment $M_z$ is calculated that stabilizes the vehicle and in addition moves it back by a relative yaw angle by which the vehicle rotated relative to the roadway as a result of the collision. The modified algorithm is designated here by reference numeral 22. The yawing moment $M_z$ calculated by vehicle dynamics controller 22 is again implemented via subordinate braking moment controllers 23 and wheel brakes 24. Depending on the design of the system, a steering actuator 25 may also be triggered instead of or in addition to the brakes, in order to steer the vehicle back to the original direction of travel.

Figure 4:
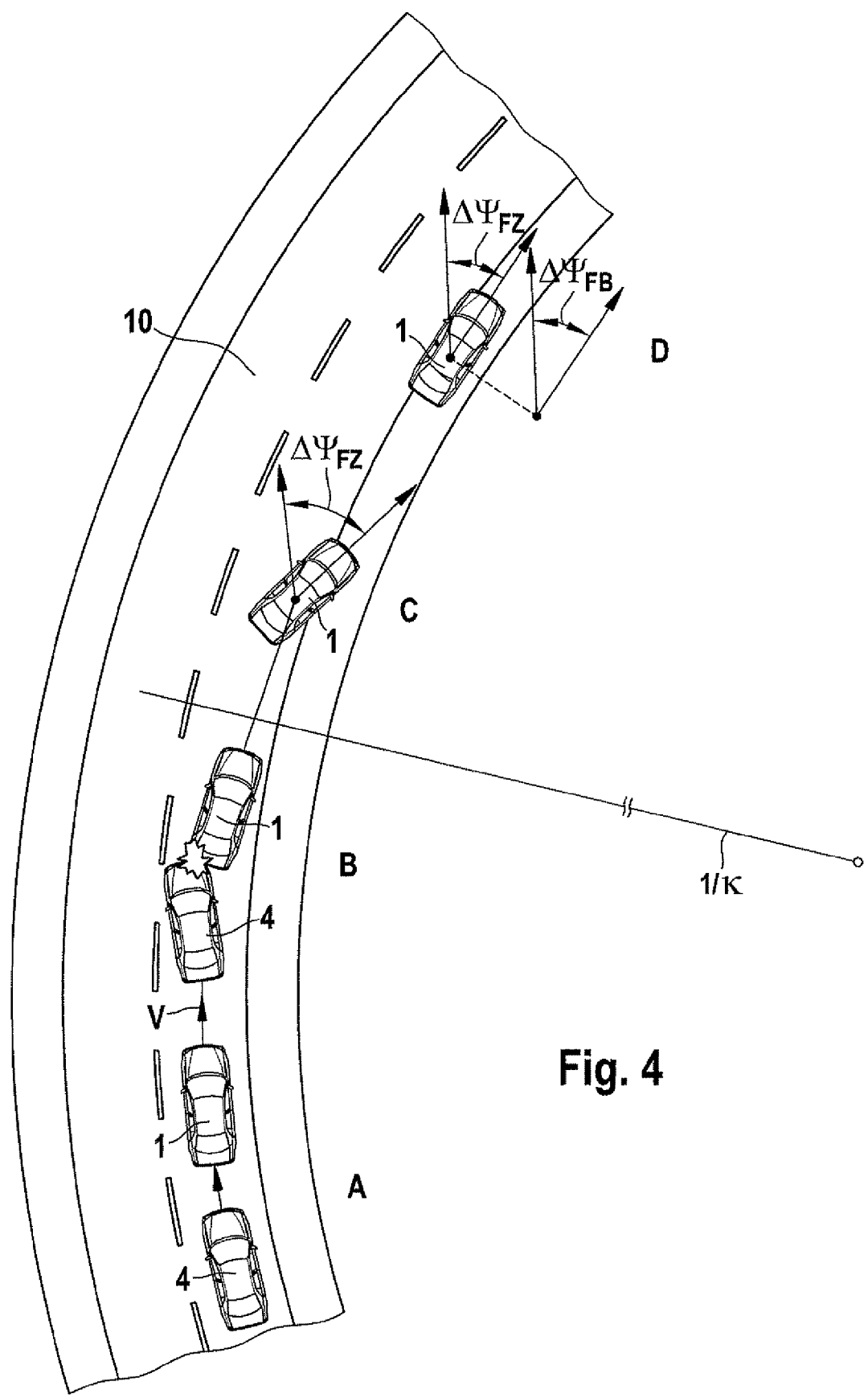
FIG. 4 shows the motion of a vehicle having a travel direction controller according to the present invention that is moving on a curved roadway, after a collision.

FIG. 4 shows the movement behavior of a vehicle 1 that is driving on a curved road 10, after a rear-end collision. In state A vehicle 1 is still moving at a velocity v in the direction of roadway 10. In state B a following vehicle 4 causes an oblique rear-end collision, which deflects vehicle 1 and causes it to rotate. In this case the vehicle dynamics controller detects a collision in combination with a yaw rate deviation, and sets a braking moment at the wheel brakes that counteracts the yawing motion of vehicle 1.

The yawing moment $M_z$ exerted by the controller is such that vehicle 1 is rotated back by a relative yaw angle by which it rotated relative to the roadway as a result of the event. The angle by which the vehicle has rotated relative to its original direction of travel is designated as $\Delta\Psi_{FZ}$. The angle by which the direction of the roadway has changed since the collision is designated as $\Delta\Psi_{FB}$. The relative yaw angle in this case is determined to be $\Delta\Psi=(\Delta\Psi_{FB}-\Delta\Psi_{FZ})$. The control continues until the relative yaw angle $\Delta\Psi$ equals zero.

What is claimed is:

1. A method for influencing a direction of travel of a vehicle which is moving in a certain direction on a roadway, the method comprising:
    monitoring a driving operation in reference to an event due to which the travel direction of the vehicle changes, deviating from the travel direction specified at a steering wheel;
    determining a relative yaw angle by which the vehicle has rotated relative to the roadway as a result of the event; and
    independently from input specified at the steering wheel, executing an automatic intervention into the driving operation, by which the vehicle is substantially rotated back by the relative yaw angle.

2. The method according to claim 1, further comprising, to detect an event, performing a plausibility test in which a relationship between a yaw behavior of the vehicle and a steering response of a driver is determined.

3. The method according to claim 1, further comprising detecting an event with the aid of a sensor system for collision detection, by analyzing at least one of an airbag sensor and a sensor for detecting a tire defect.

4. The method according to claim 1, further comprising determining a yaw angle by which the vehicle has rotated away from an original direction as a result of the event.

5. The method according to claim 4, wherein a change of the vehicle yaw angle over time since an occurrence of the event is integrated in order to determine the change in yaw angle.

6. The method according to claim 1, wherein a velocity of the vehicle after an occurrence of the event is integrated, and an angle is determined, with allowance for a curvature of the roadway, by which a direction of the roadway has changed since the occurrence of the event.

7. The method according to claim 1, wherein a vehicle that was moving on a straight path in a certain direction before an occurrence of the event is guided back to a straight line in the same direction after the occurrence of the event.

8. The method according to claim 7, further comprising determining a yaw angle by which the vehicle has rotated away from an original direction as a result of the event.

9. The method according to claim 1, wherein the automatic intervention is carried out with the aid of at least one of a brake system, a steering system and an active differential of the vehicle.

10. The method according to claim 1, wherein the automatic intervention is carried out in conjunction with a control or regulation.

11. The method according to claim 1, wherein the yaw angle is determined by integrating a yaw rate.

12. A device for influencing a direction of travel of a vehicle which is moving in a certain direction on a roadway, the device comprising:
    at least one sensor that monitors a driving operation in reference to an event due to which the travel direction of the vehicle changes, deviating from the travel direction specified at a steering wheel;
    a processor configured to determine a relative yaw angle by which the vehicle has rotated relative to the roadway as a result of the event; and
    an apparatus that, independently from input specified at the steering wheel, executes an automatic intervention into the driving operation, by which the vehicle is substantially rotated back by the relative yaw angle.

13. The device according to claim 12, wherein the device is a controller for the vehicle.

* * * * *